(12) United States Patent
Ryu et al.

(10) Patent No.: US 12,373,352 B2
(45) Date of Patent: Jul. 29, 2025

(54) METHOD AND DEVICE WITH MEMORY ACCESS REQUEST PROCESSING

(71) Applicant: Samsung Electronics Co., Ltd., Suwon-si (KR)

(72) Inventors: Dong-Uk Ryu, Seongnam-si (KR); Jaewon Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 279 days.

(21) Appl. No.: 18/073,971

(22) Filed: Dec. 2, 2022

(65) Prior Publication Data
US 2023/0229598 A1 Jul. 20, 2023

(30) Foreign Application Priority Data
Jan. 20, 2022 (KR) .................. 10-2022-0008732

(51) Int. Cl.
*G06F 12/1009* (2016.01)
*G06F 12/1027* (2016.01)

(52) U.S. Cl.
CPC ...... *G06F 12/1009* (2013.01); *G06F 12/1027* (2013.01); *G06F 2212/1024* (2013.01)

(58) Field of Classification Search
CPC ............. G06F 12/1009; G06F 12/1027; G06F 2212/1024
See application file for complete search history.

(56) References Cited

U.S. PATENT DOCUMENTS

| 7,783,858 B2 | 8/2010 | Chiang et al. |
| 9,032,244 B2 | 5/2015 | Strauss et al. |
| 2015/0378633 A1* | 12/2015 | Sahita ............... G06F 9/3004 711/163 |

(Continued)

FOREIGN PATENT DOCUMENTS

| KR | 10-1618634 B | 5/2016 |
| KR | 10-1866681 B1 | 6/2018 |

(Continued)

OTHER PUBLICATIONS

Park, Yunjoo, Kyungwoon Cho, and Hyokyung Bahn. "Challenges and implications of memory management systems under fast SCM storage." *2019 6th International Conference on Information Science and Control Engineering (ICISCE)*. IEEE, 2019.

(Continued)

*Primary Examiner* — Eric Cardwell
(74) *Attorney, Agent, or Firm* — NSIP Law

(57) ABSTRACT

Embodiments may relate to processing an access request to a memory. The access request to the memory may be based on a first virtual memory address. If a first physical memory address corresponding to the first virtual memory address is determined to be not acquired (e.g., based on a page table), it may be determined whether the first virtual memory address is a valid address. If the first virtual memory address is a valid address, a target virtual memory space or a target physical memory space for the access request may be allocated based on a free memory pool for the target kernel. The free memory pool may include currently allocated virtual and/or physical memory. The access request may be processed based on the allocated target virtual memory space or target physical memory space.

19 Claims, 13 Drawing Sheets

(56) References Cited

U.S. PATENT DOCUMENTS

2017/0075814 A1\* 3/2017 van Riel ............... G06F 12/023
2021/0374071 A1\* 12/2021 Annapareddy ......... G06F 12/08

FOREIGN PATENT DOCUMENTS

KR  10-2018-0073324 A  7/2018
KR     10-2077149 B    2/2020

OTHER PUBLICATIONS

Emrich, Tobias, et al. "On the impact of flash SSDs on spatial indexing." *Proceedings of the Sixth International Workshop on Data Management on New Hardware*. 2010.

Soma, Yuki, Balazs Gerofi, and Yutaka Ishikawa. "Revisiting virtual memory for high performance computing on manycore architectures: A hybrid segmentation kernel approach." *Proceedings of the 4th International Workshop on Runtime and Operating Systems for Supercomputers*. 2014.

Kwon, Seog Min, and Hyokyung Bahn. "Efficient memory page management for NVDIMM-based big data processing environments." *2017 4th International Conference on Information Science and Control Engineering (ICISCE)*. IEEE, 2017.

\* cited by examiner

METHOD AND DEVICE WITH MEMORY ACCESS REQUEST PROCESSING

CROSS-REFERENCE TO RELATED APPLICATIONS

This application claims the benefit under 35 USC § 119(a) of Korean Patent Application No. 10-2022-0008732, filed on Jan. 20, 2022, in the Korean Intellectual Property Office, the entire disclosure of which is incorporated herein by reference for all purposes.

BACKGROUND

1. Field

The following description relates to a technology for memory access request processing to a memory.

2. Description of Related Art

Using machine virtualization techniques, a computing device such as a server or a supercomputer may concurrently execute a lightweight kernel (LWK) along with a Linux kernel to reduce operating system (OS) noise and help ensure a stable latency.

A typical lightweight operating system or LWK executing in one partition of a computing device may lack memory protections relative to Linux executing in another partition of the computing device because of the minimalist design of lightweight operating systems. For example, when a page fault occurs in the lightweight operating system, a system hang may occur due to a failure to resolve the page fault.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method includes processing an access request to a memory, which is performed in association with execution of a target kernel of a computing device, where the method includes receiving the access request to the memory based on a first virtual memory address, determining whether a first physical memory address corresponding to the first virtual memory address is acquired based on a page table, determining, in response to determining that the first physical memory address corresponding to the first virtual memory address is not acquired, whether the first virtual memory address is a valid address, allocating, in response to determining that the first virtual memory address being is a valid address, a target virtual memory space or a target physical memory space for the access request based on a free memory pool for the target kernel, the free memory pool including currently allocated virtual and/or physical memory, and processing the access request based on the allocated target virtual memory space or target physical memory space.

The method may also include determining whether a translation lookaside buffer (TLB) miss for the first virtual memory address occurs based on a TLB associating virtual memory addresses with physical memory addresses, The determining whether the first physical memory address corresponding to the first virtual memory address is acquired may be performed in response to determining that a TLB miss has occurred.

The method may also include in response to determining that the first physical memory address corresponding to the first virtual memory address has been acquired, processing the access request based on the first physical memory address.

The determining of whether the first virtual memory address is a valid address may include determining whether the first virtual memory address is an address in a virtual memory area allocated to the target kernel.

The free memory pool may include at least one subpage.

The allocating may include allocating a physical memory subframe corresponding to the subpage.

The free memory pool may include at least one page and the subpage, where the subpage is smaller than the page.

The method may also include updating flag information on one or more pages of the target virtual memory space, wherein the flag information causes subpages of the one or more pages of the target virtual memory space to be managed with respect to the free memory pool.

The access request may include a memory allocation request, and wherein the allocating the virtual memory space or the physical memory space is based on flag information received through the memory allocation request.

The computing device ma include a central processing unit (CPU) including a plurality of cores, and at least one of the cores may be allocated for the target kernel.

The target kernel may be an auxiliary kernel executed by a main kernel.

The target kernel may be booted based on an application or program executed by the computing device, and for the target kernel, at least a portion of cores of the computing device and at least a portion of a memory area of the computing device may be allocated to the target kernel.

The method may also include allocating full frames of physical memory and associating the full frames with respective full virtual pages of a virtual memory space, allocating partial frames of the physical memory and associating the partial frames with respective partial pages of the virtual memory address space, and including partial frames and/or partial pages in the free memory pool, wherein the target virtual memory space or the target physical memory space includes a partial frame and/or a partial page.

One or more embodiments include a non-transitory computer readable recording medium storing instructions which when executed by a processor configure the processor to perform any one, any combination, or all operations and/or methods described herein.

In one general aspect, a method includes receiving an access request to a memory based on a first virtual memory address, determining whether the first virtual memory address is an invalid address, based on determining that the first virtual memory address is an invalid address, determining whether the first virtual memory address is in a memory area accessible to the target kernel, and in response to determining that the first virtual memory address is in area accessible to the target kernel, allocating a target virtual memory space or a target physical memory space for the access request based on a free memory pool.

In one general aspect, a computing device includes a processor, and a memory storing instructions configured to cause the processor to process an access request to a memory and allocate and manage virtual pages and corresponding physical frames, allocate and manage virtual subpages of the virtual pages and physical subframes of the physical frames, provide a free memory pool including at least a portion of the virtual subpages and/or a portion of the physical subframes, receive an access request to a memory based on a first virtual memory address, determine whether a first physical memory address corresponding to the first virtual memory address is in a page table, determine, in response to determining that the first physical memory address corresponding to the first virtual memory address is not acquired, whether the first virtual memory address is a valid address, and for the access request, in response to determining that the first virtual memory address is a valid address, allocate a target virtual memory space or a target physical memory space from the free memory pool.

The processor may include a core allocated to the target kernel from among a plurality of cores of the computing device.

The target physical memory space may be a portion of an entire storage space of a random-access memory (RAM) of the computing device.

The allocating may be performed based on a page fault.

The page fault may correspond to a physical frame not having been allocated for the first virtual memory address.

The free memory pool may include at least one virtual page or physical frame, and one virtual subpage or physical subframe.

The target virtual memory space or the target physical memory space may include a virtual subpage of a page having an allocated status or a physical subframe of a physical frame having an allocated status.

In one general aspect, a method includes allocating full frames of physical memory of a computing device and associating the full frames with respective full virtual pages of a virtual memory space, allocating partial frames of the physical memory and associating the partial frames with respective partial pages of the virtual memory address space, and receiving a memory allocation request for a virtual memory address in the virtual memory address space, and based thereon, allocating a partial frame of the physical memory and associating the partial frame with the virtual memory address.

The method may also include maintaining a free memory pool based on the allocating of the full frames and/or the allocating of the partial frames, and allocating the partial frame from the free memory pool.

The allocating the partial frame may be based on a page fault associated with the memory allocation request.

Prior to receiving the memory allocation request a frame may be marked as allocated, the partial frame may include a portion of the frame, and the partial frame may be marked as available for allocation.

The partial frame may be marked as available based on not yet being used.

The allocating the partial frame may be based on determining that the virtual memory address is in a virtual memory space accessible to a process or kernel associated with the memory allocation request.

Other features and aspects will be apparent from the following detailed description, the drawings, and the claims.

Figure 1:
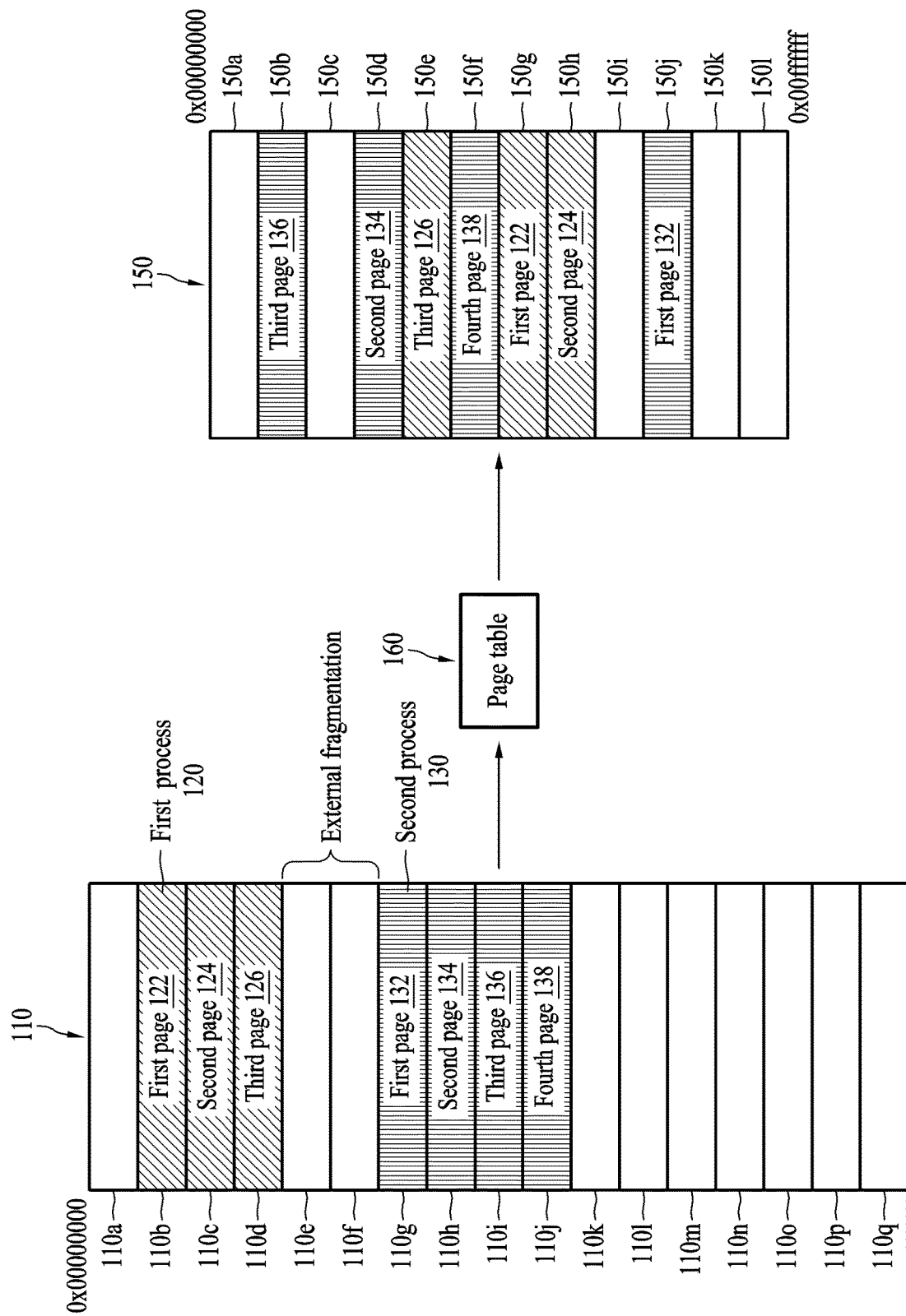
FIG. 1 illustrates an example of an entire space of a virtual memory, an entire space of a physical memory, and a page table, according to one or more embodiments.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The terminology used herein is for the purpose of describing particular examples only and is not intended to be limiting. As used herein, the singular forms "a," "an," and "the," are intended to include the plural forms as well, unless the context clearly indicates otherwise. As used herein, the term "and/or" includes any one and any combination of any two or more of the associated listed items. As used herein, the terms "comprises," "comprising," "includes," and/or "including," specify the presence of stated features, integers, operations, elements, and/or components, but do not preclude the presence or addition of one or more other features, integers, operations, elements, components, and/or groups thereof.

Unless otherwise defined, all terms, including technical and scientific terms, used herein have the same meaning as commonly understood by one of ordinary skill in the art to which this disclosure pertains after an understanding of the present disclosure. Terms, such as those defined in commonly used dictionaries, are to be interpreted as having a meaning that is consistent with their meaning in the context of the relevant art and the present disclosure and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

A component having a common or similar function with a component included in one example may be described using a like name in another example. Unless otherwise described, a description made in one example may be applicable to another example and a detailed description within a duplicate range is omitted.

FIG. 1 illustrates an example of an entire space of a virtual memory, an entire space of a physical memory, and a page table, according to one or more embodiments.

Using virtualization technology, a plurality of operating systems or a plurality of kernels may be simultaneously operated in one computing device (e.g., a server). As an example, the a main operating system (e.g., Linux) and a lightweight operating system (e.g., McKernel) may execute on the same computing device. As another example, the plurality of kernels may include a main kernel (e.g., a Linux kernel) of the main operating system and a lightweight kernel (or auxiliary kernel).

When the computing device is booted, the main operating system and the lightweight operating system may each be booted, for example, in respective partitions. For example, processing devices (e.g., CPUs or cores) of the computing device and portions of the computing device's entire physical memory space may be allocated to the operating systems for exclusive use thereby.

When the computing device is booted, the main operating system may be booted first, and if necessary, the lightweight operating system (or lightweight kernel) may be booted by the main operating system (or main kernel). In this case, some of the processing devices (e.g., CPUs or cores) of the computing device and a portion of the entire physical memory space may be allocated to the booted lightweight operating system for exclusive use thereby.

For example, such a portion of the total physical memory space allocated exclusively to the lightweight operating system may be a physical memory space 150 ranging from an address 0x00000000 to an address 0x00ffffff. The physical memory space 150 may be, for example, a portion of the total memory space of the computing device, e.g., the computing device's random-access memory (RAM) (e.g., dynamic RAM (DRAM)). The physical memory space 150 may include a plurality of frames 150a through 150l, for example, which may a first size (e.g., 4 kilobytes (Kbyte), 8 Kbyte, or 16 Kbyte).

To make use of the physical memory space 150 allocated to the lightweight operating system, A processor resource (e.g., one or more cores) of the computing device allocated to the lightweight operating system may set a virtual memory space 110 having a preset size under a control of the lightweight kernel. The virtual memory space 110 may have, for example, addresses from 0x00000000 to 0x7fffffff. The virtual memory space 110 may be managed as a plurality of pages 110a through 110q, also having the first size (e.g., 4 Kbyte, 8 Kbyte, or 16 Kbyte). Although in this example the physical memory space 150 is smaller than the virtual memory space 110, in some cases they may be the same size.

When a process (instructions, thread, program, or application) is executed through the lightweight operating system, an allocator of the kernel of the lightweight operating system may allocate one or more pages for the process from the virtual memory space 110. For example, when a first process 120 is executed, virtual memory pages 110b, 110c, and 110d of the virtual memory space 110 may be allocated to the first process 120, and to back the virtual memory pages, a first page 122 through a third page 126 of the physical memory space 150 may be mapped to the virtual pages 110b, 110c, and 110d (e.g., in a page table 160). As another example, when a second process 130 is executed, the virtual pages 110g, 110h, 110i, and 110j of the virtual memory space 110 may be allocated to the second process 130, and a first page 132 through a fourth page 138 from the physical memory space 150 may be mapped to the virtual pages 110g, 110h, 110i, and 110j (e.g., in the page table 160).

As noted, pages used in the virtual memory space 110 may be mapped to frames in the physical memory space 150 through the page table 160. For example, the page table may include mapping information that associates the page 110b with the frame 150g. FIG. 1 illustrates an example in which the pages 122, 124, 126, 132, 134, 136, and 138 allocated to the first and second processes mentioned above correspond to the frames 150b, 150d, 150e, 150f, 150g, 150h, and 150j of the physical memory space 150. In some cases, a virtual memory page may be allocated to a process, and a frame corresponding to the allocated virtual memory page may not be allocated immediately. In such cases, when a memory access request through the virtual memory page actually occurs, a frame corresponding to the page may be allocated. For example, the access request may be an application programming interface (API) call to read or write.

A plurality of pages for a process may be allocated from the virtual memory space 110 to have contiguous addresses. As pages for various processes are allocated and then released, fragmented pages (e.g., the pages 110a, 110e, and 110f) may be occur in the virtual memory space 110. The aforementioned fragmentation of the pages may be referred to as external fragmentation. An external-fragmented page may be a normal page available for allocation, however, the more external-fragmented pages that arise over time, the greater the external fragmentation within the virtual memory space 110 and the less efficient the virtual memory space 110 becomes.

In addition to the external fragmentation, internal fragmentation may also occur in the virtual memory space 110. The internal fragmentation of the virtual memory space 110 will be described next with reference to FIG. 2.

Figure 2:
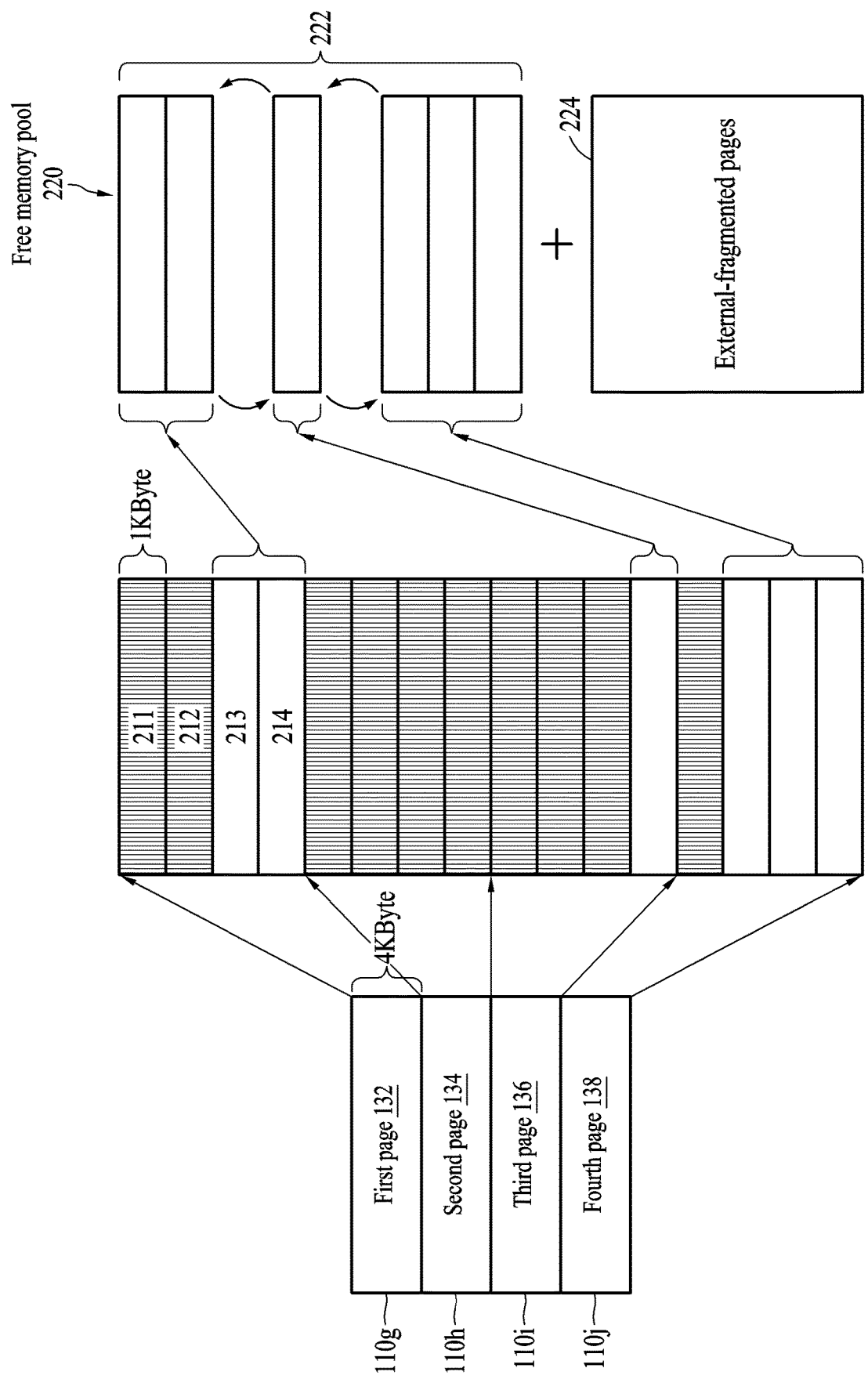
FIG. 2 illustrates internal-fragmented subpages of pages of a virtual memory and a free memory pool based on the internal-fragmented subpages, according to one or more embodiments.

FIG. 2 illustrates internal-fragmented subpages of pages of a virtual memory and a free memory pool based on the internal-fragmented subpages, according to one or more embodiments. Although the entire page 110*g* is allocated for the first page 132 of the second process 130 (in the example of FIG. 1), only a fraction of the capacity of the page 110*g* may be in actual use. For example, the actual used capacity of the page 110*g* may be 2 Kbyte out of the total 4 Kbyte. Unused capacity of the page 110*g* may be referred to as internal fragmentation. As the internal fragmentation within a virtual memory increases, efficiency of using the virtual memory may decrease. In addition, only 2 Kbyte out of 4 Kbyte frame of physical memory allocated for the page 110*g* may be used, so internal fragmentation of the physical memory may also appear. Such internal fragmentation of the physical memory may impair memory management.

As described next, a method of micro paging (using subpages and subframes) may be employed to manage internal-fragmentation and thereby reduce the above-described problem caused by internal fragmentation of the memory.

Each of the pages 110*g*, 110*h*, 110*i*, and 110*j* allocated to the second process 130 may have a first size (e.g., 4 Kbyte, 8 Kbyte, or 16 Kbyte). A kernel of a lightweight operating system may allocate, to the second process 130, the pages 110*g*, 110*h*, 110*i*, and 110*i*, each managed as having a plurality of subpages (or micro pages). The page 110*g* may be managed as having, for example, subpages 211 through 214. Each of the subpages 211 through 214 may have a second size (e.g., 1 Kbyte) smaller than the first size. For example, when the kernel allocates, to the second process 130, the page 110*g*, the page 110*g* maybe managed as having subpages 211 through 214. Managing the subpages 211 through 214 may include recording information on the page 110*g* in a page structure (e.g., in a page table). Such information indicating whether a page of the virtual memory is composed of subpages may be implemented as a micro allocation flag that may be included in an access request and/or in a page structure for a page table.

The kernel of the lightweight operating system may manage a free memory pool 200 based on internal-fragmented subpages 222 according to the aforementioned flag information for tracking subpages. The free memory pool 200 should be distinguished from any unallocated physical or virtual memory of the computing device. For example, the kernel may register the unused subpages 213 and 214 (from among the subpages 211 through 214) in the free memory pool 200. Additionally or alternatively, external-fragmented pages 224 may be registered in the free memory pool 200. The external-fragmented pages 224 of the free memory pool 200 may be pages of virtual memory that are not allocated for a process. The external-fragmented page may have a first size and not be composed of subpages, but is not limited to the example described herein. Also, other unallocated pages may be registered in the free memory pool 200, regardless of internal or external fragmentation thereof. In sum, through various memory resources, the free memory pool 200 may act as a memory reserve to be used for handling problematic memory access requests.

When a page is allocated to a process, a frame of a physical memory corresponding to the page may be allocated and subsequently managed according to a memory allocation scheme. For example, when a size of a page is 4 Kbyte, a size of a frame may be 4 Kbyte. When a page is flagged as including subpages, subframes (or micro frames) of a frame may be allocated to each of the subpages. For example, when a size of a subpage is 1 Kbyte, a size of a subframe may be 1 Kbyte.

In the foregoing example, when the subpages 213 and 214 are managed by a free memory pool 220, subframes of the physical memory allocated to correspond to the subpages 213 and 214 may also be managed by the free memory pool 220. The kernel of the lightweight operating system may efficiently manage its memory using the free memory pool 220 and may process an abnormal memory access request.

A method of allocating memory and a method of processing an access request to memory will be described next reference to FIGS. 3 through 12.

Figure 3:
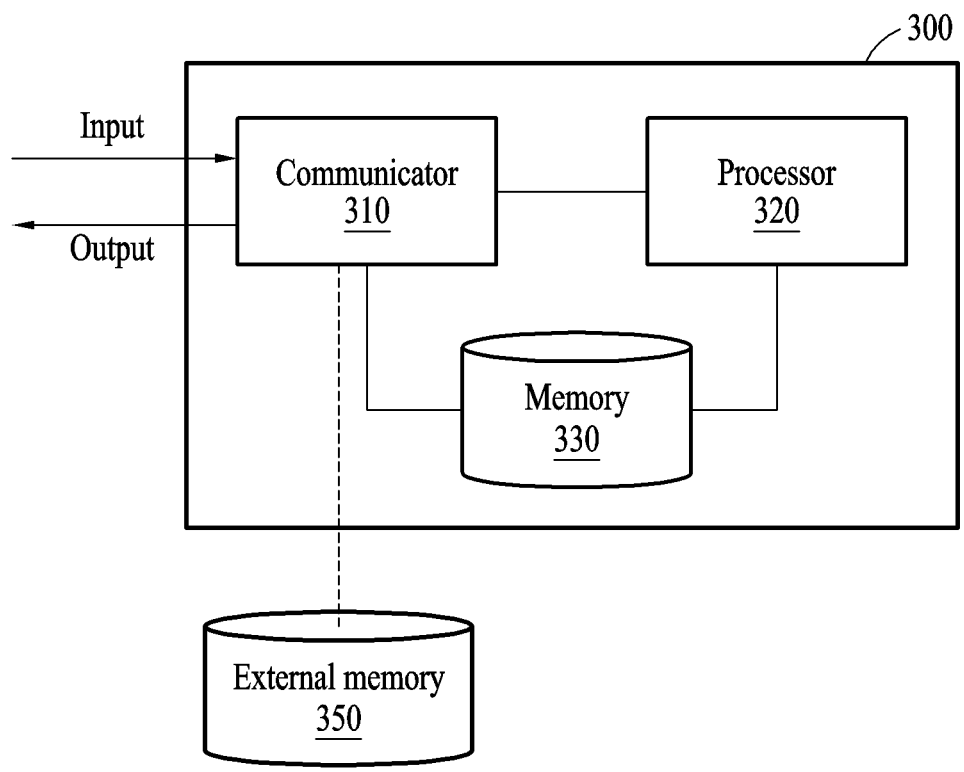
FIG. 3 illustrates an example of a computing device, according to one or more embodiments.

FIG. 3 illustrates an example of a computing device 300, according to one or more embodiments. The computing device 300 may include a communicator 310, a processor 320, and a memory 330. The computing device 300 may be, for example, the computing device with one or more CPUs or cores as described with reference to FIG. 1, though examples are not limited thereto.

The communicator 310 is connected to the processor 320 and the memory 330 to transmit and receive data. The communicator 310 may be connected to an external device to transmit and receive data. Hereinafter, transmitting and receiving "A" may represent transmitting and receiving "information or data that indicates or includes A."

The communicator 310 may be configured as circuitry within the computing device 300. For example, the communicator 310 may include an internal bus and an external bus. As another example, the communicator 310 may be a component that connects the computing device 300 and an external device. The communicator 310 may be an interface. The communicator 310 may receive data from the external device and transmit the data to the processor 320 and the memory 330. In some examples, the communicator 310 may be a network interface card (NIC), though examples are not limited thereto.

The processor 320 processes data received by the communicator 310 and data stored in the memory 330. The processor 320 may be implemented as hardware having a circuit with a physical structure for executing desired operations. For example, the desired operations may include instructions or code, e.g., corresponding to a stored program. The processor 320 may include, for example, a microprocessor, a CPU, a processor core, a multi-core processor, a multiprocessor, an application-specific integrated circuit (ASIC), a field programmable gate array (FPGA), or the like. The processor 320 may execute such computer-readable instructions or code (e.g., software) stored in a memory (e.g., the memory 330), instructions generated by the processor 320, etc.

The memory 330 stores data received by the communicator 310 and data processed by the processor 320. The memory 330 may be, for example, a cache memory or buffer of the computing device 300. The memory 330 may store a program (or application or software) in the form of instructions executable by the processor 320. For example, the stored program may be a set of syntaxes that are coded to be capable of allocating a memory and to be executable by the processor 320. As another example, the stored program may be a set of instructions that are coded to be capable of being executed by the processor 320 to process a memory access request.

The computing device 300 may be connected to an external memory 350 through the communicator 310. The external memory 350 may include, for example, volatile memory, non-volatile memory, random-access memory (RAM), a flash memory, a hard disk drive, an optical disk drive, or the like. An instruction set, for example software or a program for operating the computing device 300, may be stored in the external memory 350. The instructions for operating the computing device 300 may be executed by the processor 320.

When an operating system (e.g., lightweight operating system) of the computing device 300 or an operating system is booted, the computing device 300 may operate based on the data stored in the memory 330. When the operating system is booted, the computing device 300 may load data stored in the external memory 350 to the computing device 300 and operate based on the loaded data.

The communicator 310, the processor 320, the memory 330, and the external memory 350 will be referred to further with reference to FIGS. 4 through 12.

Figure 4:
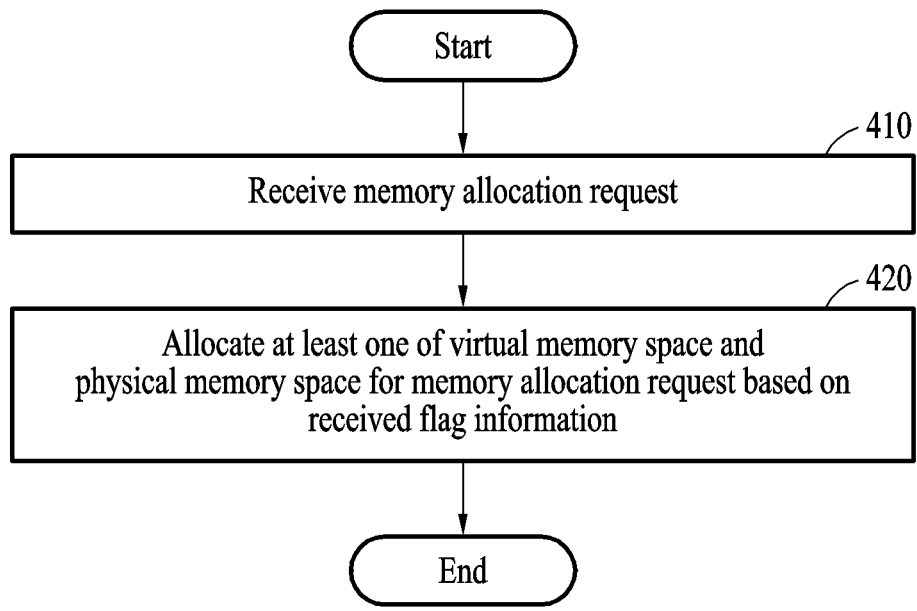
FIG. 4 illustrates an example of allocating a virtual memory space or a physical memory space for a memory allocation request, according to one or more embodiments.

FIG. 4 illustrates an example of allocating a virtual memory space or a physical memory space for a memory allocation request, according to one or more embodiments. Operations 410 and 420 may be performed by the computing device 300. The computing device 300 may be a server, for example. In some implementations, a plurality of operating systems (e.g., a main operating system and a lightweight operating system) may be simultaneously executed in the computing device 300, wherein hardware resources thereof have been allocated to the lightweight operating system. For example, the computing device 300 may include a CPU including a plurality of cores, and at least one of the cores may be allocated to a target kernel. The computing device 300 may be controlled by the lightweight operating system or a kernel of the lightweight operating system. Hereinafter, operations performed by the computing device 300 that is controlled by the lightweight operating system or the kernel are described.

In operation 410, the computing device 300 may receive a memory allocation request. For example, when a new process is executed, the computing device 300 may receive a request to allocate memory for the process.

The memory allocation request may include flag information. The flag information may include, for example, a flag indicating a memory allocation scheme. The flag indicating the memory allocation scheme may include, for example, a first flag, a second flag, a third flag, and/or a fourth flag representing different schemes, respectively. The four flags are described in detail with reference to FIGS. 5 through 8.

The flag information may include the first flag, namely, a micro allocation flag indicating whether a page of an allocated memory space is to be managed as including subpages. For example, when the flag information does not include the micro allocation flag, or when the micro allocation flag included in the flag information indicates that a micro allocation is unapplied, the page of the allocated memory space may be managed as not including subpages. When the micro allocation flag is included in the flag information (or otherwise indicates that the micro allocation scheme is to be applied), the page of the allocated memory space may be managed as including subpages.

In operation 420, the computing device 300 may allocate a virtual memory space or a physical memory space for the memory allocation request. For example, the computing device 300 may allocate a portion of pages of the virtual memory space (e.g., the virtual memory space 110 of FIG. 1) for the kernel of the lightweight operating system to the corresponding process.

A memory allocator of the computing device 300 may allocate pages from the virtual memory space for the corresponding process. When the flag information is absent from the memory allocation request, the memory allocator may allocate a memory for the process through an existing memory allocation scheme. In contrast, when the flag information is present from the memory allocation request, the memory allocator may allocate a memory for the process based on a flag of the flag information. The process for which the memory is allocated may be executed based on the allocated memory space.

Figure 5:
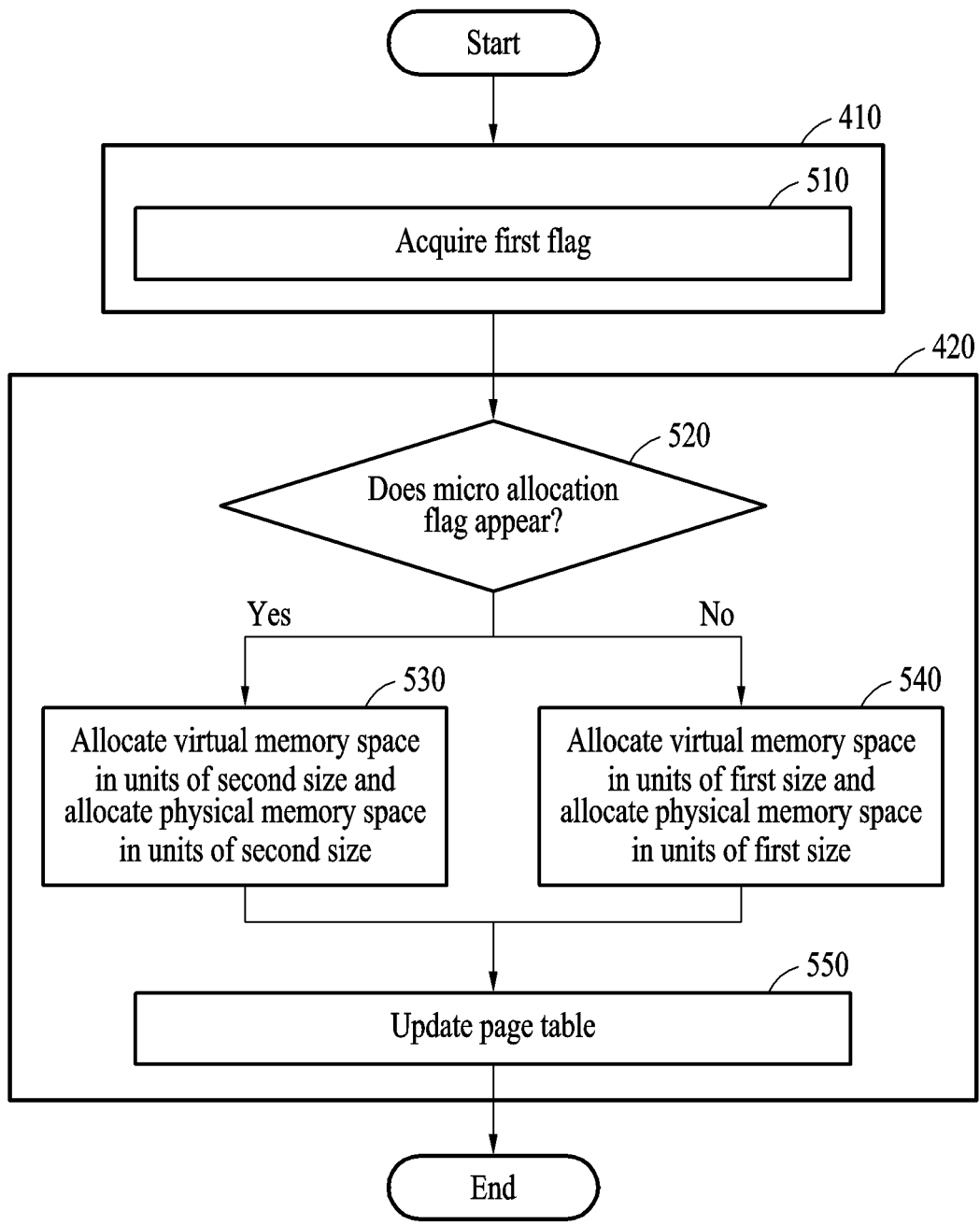
FIG. 5 illustrates an example of allocating a virtual memory space or a physical memory space for a memory allocation request based on a first flag of the memory allocation request, according to one or more embodiments.

FIG. 5 illustrates an example of allocating a virtual memory space or a physical memory space for a memory allocation request based on a first flag of the memory allocation request, according to one or more embodiments. Operation 410 of FIG. 4 may include operation 510 as described next.

In operation 510, the computing device 300 may acquire a first flag (e.g., FLAG_0) from flag information of a memory allocation request. The first flag may represent a first memory allocation scheme. For example, the first memory allocation scheme may be a scheme of allocating a virtual memory space and a physical memory space together to the corresponding process.

Operation 420 of FIG. 4 may include operations 520 through 550 as described next. In operation 520, the computing device 300 may determine whether a micro allocation flag is present (or set) in the flag information. For example, when the micro allocation flag appears, a page may be managed as including a plurality of subpages.

When the micro allocation flag appears, operation 530 may be performed. When the micro allocation flag does not appear, operation 540 may be performed.

In operation 530, when the micro allocation flag has been determined to appear in the flag information, the computing device 300 may allocate the virtual memory space in units of a second size (e.g., 1 Kbyte) and allocate the physical memory space in units of the second size (e.g., 1 Kbyte). For example, when a first page and a second page are allocated to the virtual memory space, each of the first page and the second page may include a plurality of subpages. When a size of each of the first page and the second page is 4 Kbyte, the first page and the second page may each include four subpages, each having a size of 1 Kbyte. The computing device 300 may allocate a first frame and a second frame (corresponding to the first page and the second page) from the physical memory space (e.g., the physical memory space 150 of FIG. 1). Each of the first frame and the second frame may have a size of 4 Kbyte. The first frame and the second frame may each include four subframes having a size of 1 Kbyte.

In operation 540, when the micro allocation flag has been determined to not appear in the flag information, the computing device 300 may allocate the virtual memory space in units of a first size (e.g., 4 Kbyte) and allocate the physical memory space in units of the first size (e.g., 4 Kbyte).

In operation 550, the computing device 300 may update a page table based on information on the memory allocated for the process by operation 530 or operation 540. For example, the computing device 300 may record mapping information indicating which pages of the virtual memory space are associated with which frames of the physical memory space allocated for the corresponding process in the page table.

Information on the memory allocated for the process may be recorded in a page structure included in or linked to the page table. By referencing the page structure, the computing device 300 may verify whether a given page is managed as including a plurality of subpages. Based on this information, a previously allocated but unused subpage (allocated to another process for example) may be registered in a free memory pool (e.g., the free memory pool 220) by adding its address to the free memory pool. In addition, a subframe mapped to the subpage may also be managed based on the free memory pool.

Figure 6:
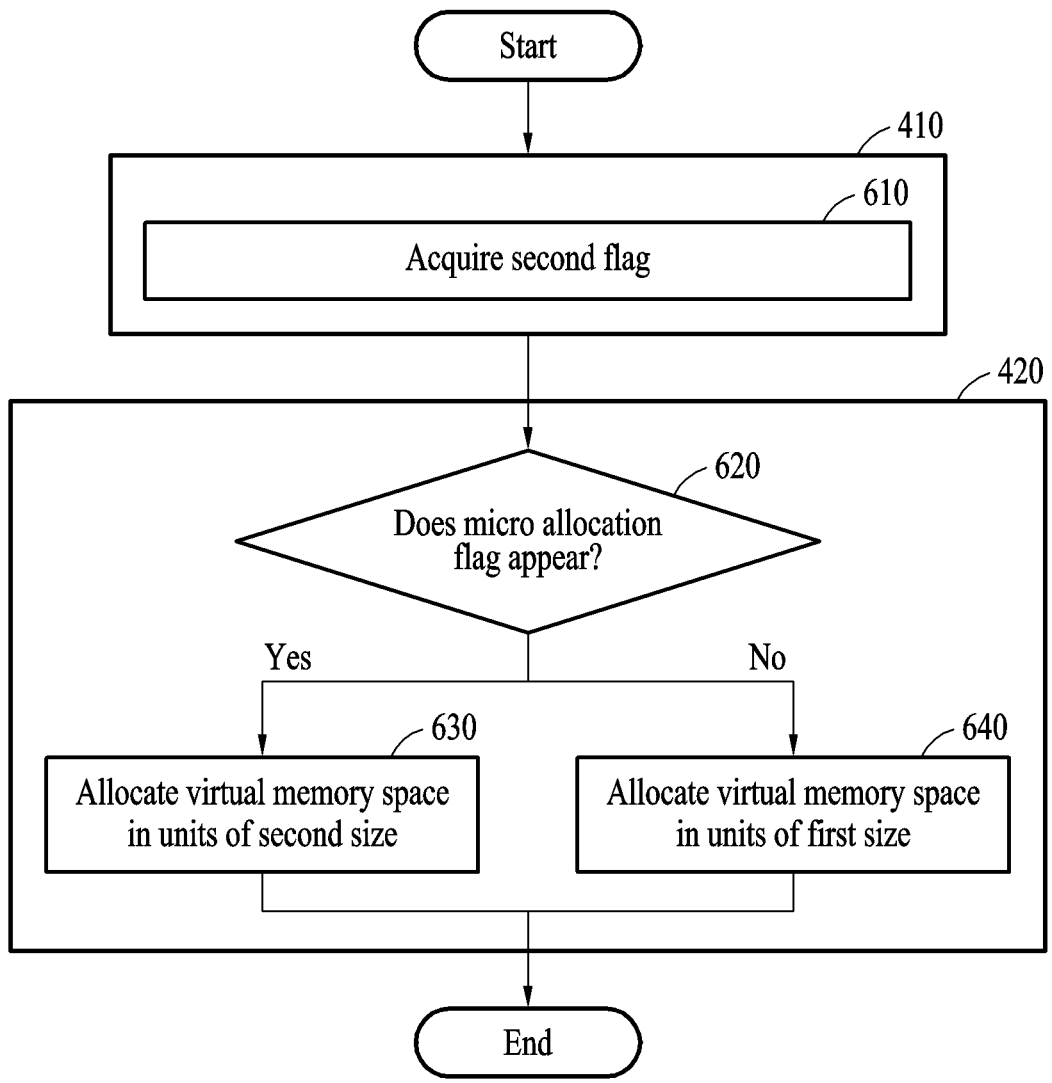
FIG. 6 illustrates an example of allocating a virtual memory space for a memory allocation request based on a second flag of the memory allocation request, according to one or more embodiments.

FIG. 6 illustrates an example of allocating a virtual memory space for a memory allocation request based on a second flag of the memory allocation request, according to one or more embodiments. Operation 410 of FIG. 4 may include operation 610 as described below.

In operation 610, the computing device 300 may acquire a second flag (e.g., FLAG_1) from flag information of a memory allocation request. The second flag may represent a second memory allocation scheme. For example, the second memory allocation scheme may be a scheme of allocating a virtual memory space to a corresponding process, and allocating a physical memory space at a time when an access request to the virtual memory occurs. The second memory allocation scheme may be a copy on write (COW) scheme.

Operation 420 of FIG. 4 may include operations 620 through 640 as described below. In operation 620, the computing device 300 may determine whether a micro allocation flag appears from the flag information. For example, when the micro allocation flag appears, a page may include a plurality of subpages. When the micro allocation flag appears, operation 630 may be performed. When the micro allocation flag does not appear, operation 640 may be performed.

In operation 630, when the micro allocation flag appears in the flag information, the computing device 300 may allocate a virtual memory space in units of a second size (e.g., 1 Kbyte). For example, when a first page and a second page are allocated to the virtual memory space, each of the first page and the second page may be managed as including a plurality of subpages. When a size of each of the first page and the second page is 4 Kbyte, the first page and the second page may each include four subpages, each having a size of 1 Kbyte.

In operation 640, when the micro allocation flag does not appear in the flag information, the computing device 300 may allocate the virtual memory space in units of a first size (e.g., 4 Kbyte).

Figure 7:
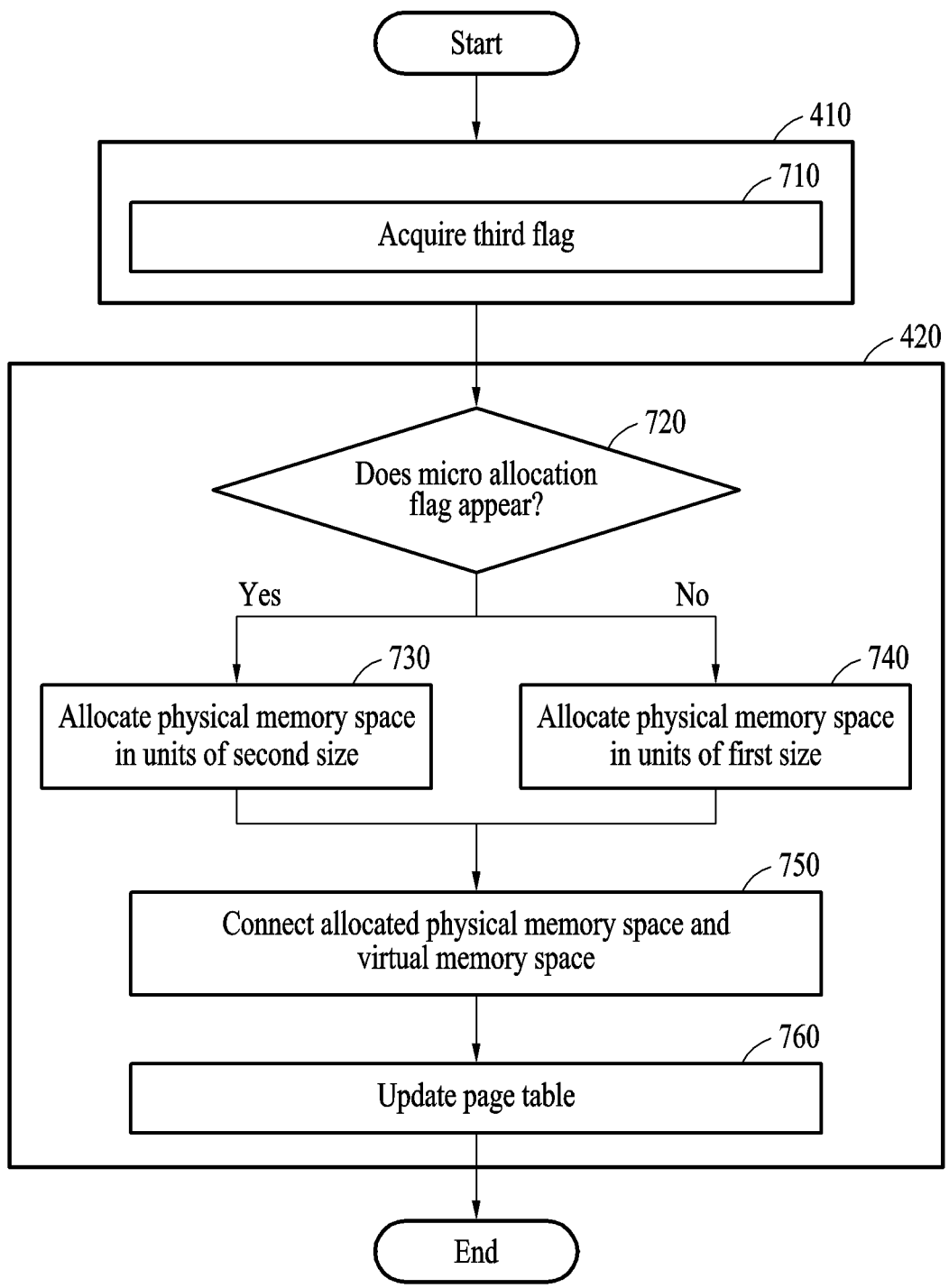
FIG. 7 illustrates an example of allocating a physical memory space for a memory allocation request based on a third flag of the memory allocation request, according to one or more embodiments.

FIG. 7 illustrates an example of allocating a physical memory space for a memory allocation request based on a third flag of the memory allocation request, according to one or more embodiments. Operation 410 of FIG. 4 may include operation 710 as described next.

In operation 710, the computing device 300 may acquire a third flag (e.g., FLAG_2) from flag information of a memory allocation request. The third flag may represent a third memory allocation scheme. For example, the third memory allocation scheme may be a scheme of allocating a physical memory space to a corresponding process and associating the physical memory space with a previously allocated virtual memory space.

Operation 420 of FIG. 4 may include operations 720 through 760 as described next. In operation 720, the computing device 300 may determine whether a micro allocation flag appears from the flag information. For example, when the micro allocation flag appears, a page may be managed as including a plurality of subpages. That is, when the micro allocation flag appears, operation 730 may be performed, and when the micro allocation flag does not appear, operation 740 may be performed.

In operation 730, when the micro allocation flag appears in the flag information, the computing device 300 may allocate a physical memory space in units of a second size (e.g., 1 Kbyte). For example, the physical memory space may be allocated such that a frame of a first size (e.g., 4 Kbyte) includes subframes of a smaller second size.

In operation 740, when the micro allocation flag does not appear in the flag information, the computing device 300 may allocate the physical memory space in units of the first size (e.g., 4 Kbyte).

Whether the physical memory space has been allocated by operation 730 or operation 740, in operation 750, the computing device 300 may associated the physical memory space allocated for the process and the previously allocated virtual memory space, and in operation 760, the computing device 300 may update a page table based on information about the memory space allocated for the process. For example, the computing device 300 may record, in the page table, mapping information associating frames of the physical memory space (allocated for the process) with pages of the virtual memory space.

Figure 8:
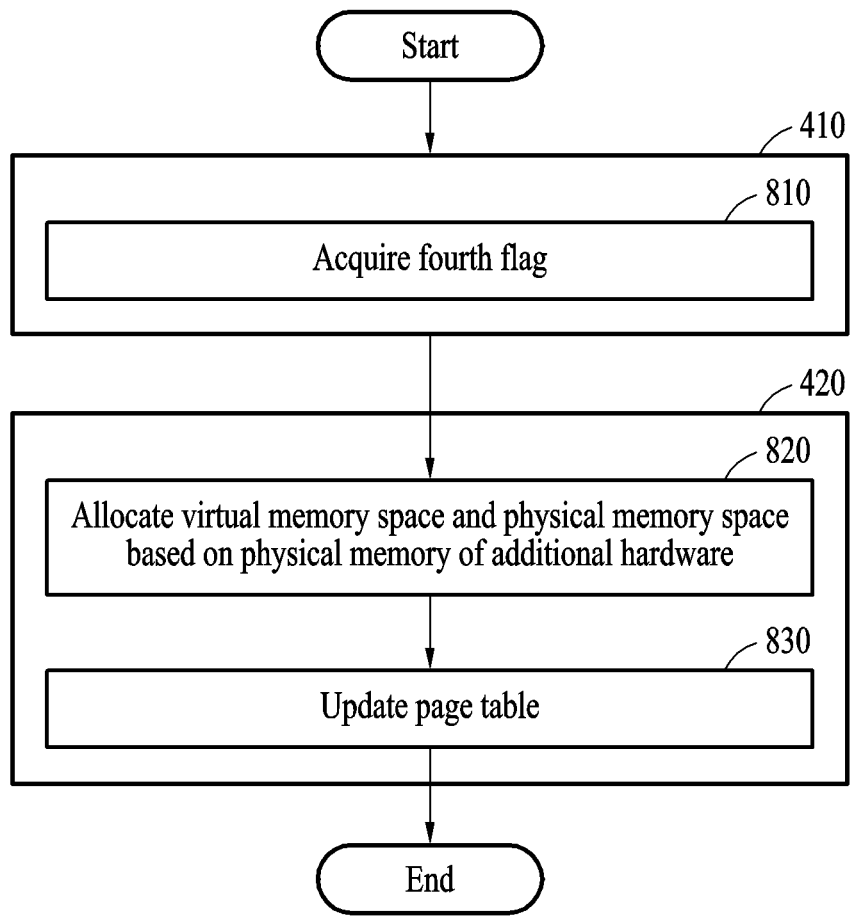
FIG. 8 illustrates an example of allocating a virtual memory space and a physical memory space for a memory allocation request using a physical memory of additional hardware based on a fourth flag of the memory allocation request, according to one or more embodiments.

FIG. 8 illustrates an example of allocating a virtual memory space and a physical memory space for a memory allocation request using a physical memory of additional hardware based on a fourth flag of the memory allocation request, according to one or more embodiments. Operation 410 of FIG. 4 may include operation 810 as described below.

In operation 810, the computing device 300 may acquire a fourth flag (e.g., FLAG_3) from flag information of a memory allocation request. The fourth flag may represent a fourth memory allocation scheme. For example, the fourth memory allocation scheme may be a scheme of allocating a memory space to a corresponding process using resources of additional hardware connected to the computing device 300. The additional hardware may be, for example, a graphics processing device, for example a graphic processing unit (GPU) and a memory thereof.

Operation 420 of FIG. 4 may include operations 820 and 830 as described next.

In operation 820, the computing device 300 may allocate a virtual memory space and a physical memory space using physical memory of the additional hardware. To avoid a situation where (i) the virtual memory space managed by the additional hardware and (ii) a memory space managed by the computing device 300 designate the same physical memory space, a portion of the physical memory space of the additional hardware may be preemptively designated for exclusive use by the computing device 300.

In operation 830, the computing device 300 may update a page table based on information on a memory space allocated for a process. For example, the computing device 300 may record, in the page table, mapping information associating pages of the virtual memory space (allocated for the process) with frames of the physical memory space of the additional hardware.

Figure 9:
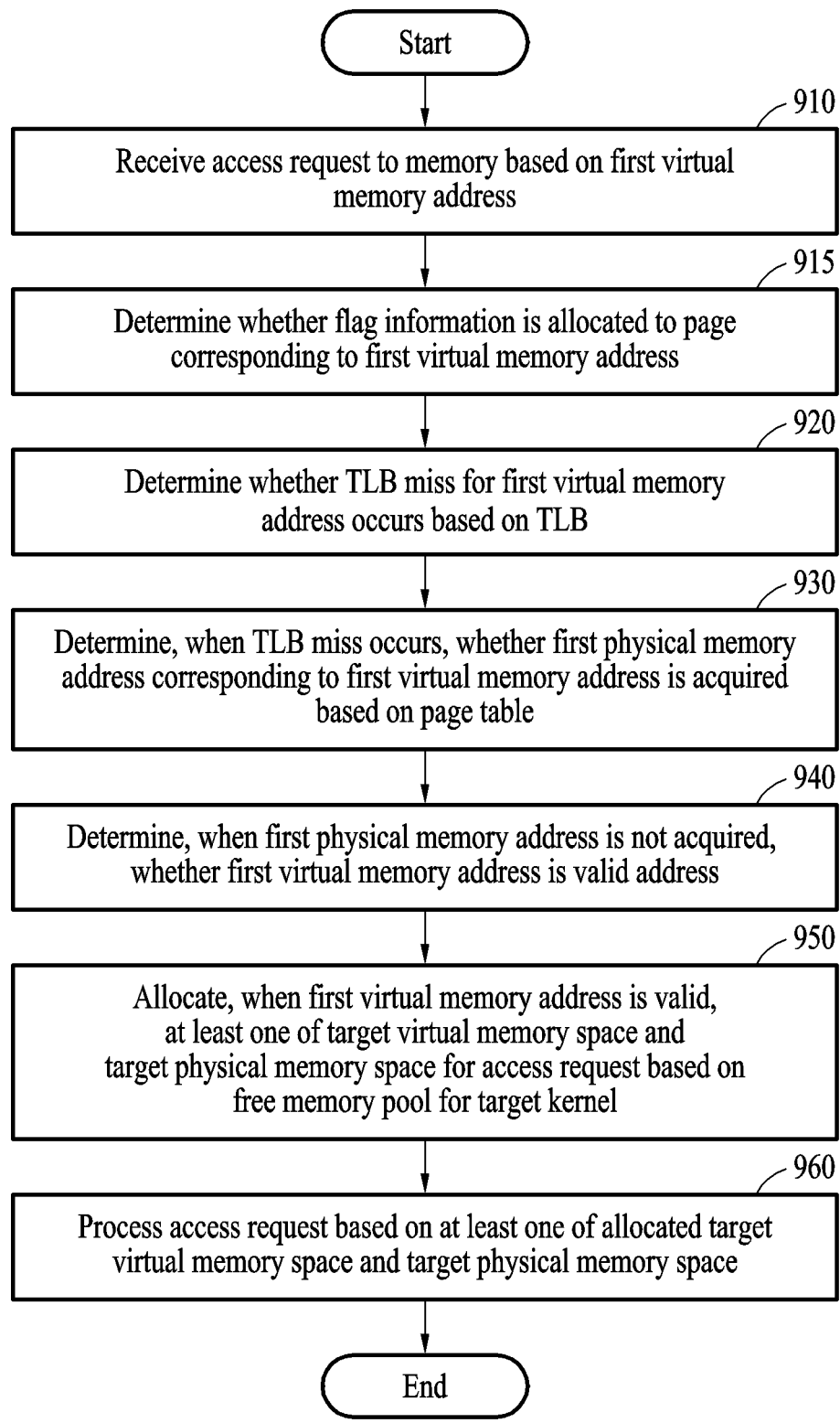
FIG. 9 illustrates an example of processing an access request for a memory, according to one or more embodiments.

FIG. 9 illustrates an example of processing an access request for a memory, according to one or more embodiments. How the access request is processed may depend on flag information recorded in a page table, as described above.

The following operations may be performed by the computing device 300 of FIG. 3. The computing device 300 may be a server, for example. In some implementations, a plurality of operating systems (e.g., a main operating system and a lightweight operating system) may be simultaneously executed in the computing device 300. Hardware resources of the computing device 300 may be allocated to the lightweight operating system. The computing device 300 may be controlled by the lightweight operating system or a target kernel of the lightweight operating system. Operations described hereafter are performed by the computing device 300 as controlled by the lightweight operating system or the target kernel.

In operation 910, the computing device 300 may receive an access request to a memory (e.g., physical memory) from a target process based on a first virtual memory address. For example, the access request may be a request to read data from (or write data to) a first virtual memory address, and by implication, a first physical memory address corresponding to the first virtual memory address.

In operation 915, the computing device 300 may determine whether flag information is allocated to the first virtual memory address or a page corresponding to the first virtual memory address. For example, when the flag information is allocated to the page corresponding to the first virtual memory address, operation 920 may be performed, and when the flag information is not allocated to the page corresponding to the first virtual memory address, operation A may be performed. Operation A will be described with reference to FIG. 13.

In operation 920, the computing device 300 may determine whether a translation lookaside buffer (TLB) miss for the first virtual memory address occurs by checking for the first virtual memory address in a TLB that associates addresses of a virtual memory with addresses of a physical memory.

When a TLB hit occurs in operation 920, the computing device 300 may acquire from the TLB a first physical memory address corresponding to the first virtual memory address and process the access request based on the acquired first physical memory address. For example, when the access request is a read request, the computing device 300 may acquire data from the first physical memory address and transmit the acquired data to the target process. As another example, when the access request is a write request, the computing device 300 may store data in the first physical memory address.

In operation 930, when a TLB miss occurs at operation 920, the computing device 300 may determine whether the first physical memory address corresponding to the first virtual memory address is acquired based on a page table (e.g., the page table 160 of FIG. 1). That is, operation 930 involves determining whether a physical memory address corresponding to the first virtual memory address is present in the page table. When the first physical memory address corresponding to the first virtual memory address is not acquired, a page fault may occur. An operation performed when the first physical memory address corresponding to the first virtual memory address is acquired will be further described in detail with reference to FIG. 10.

In operation 940, when the first physical memory address corresponding to the first virtual memory address is not acquired, for example, when the page fault occurs, the computing device 300 may determine whether the first virtual memory address is a valid address. For example, by determining whether the first virtual memory address is an address in a virtual memory space allocated for a lightweight operating system or a target kernel of the lightweight operating system, the computing device 300 may determine whether the first virtual memory address is a valid address. As another example, the computing device 300 may determine whether the first virtual memory address is a valid address by determining whether the first virtual memory address is an address in pages allocated for the target process. When the first virtual memory address is determined to be an invalid address, an unhandled page fault may occur. An operation performed when the first virtual memory address is invalid, for example, when the unhandled page fault occurs will be further described in detail with reference to FIG. 11.

In operation 950, when the first virtual memory address is determined to be valid, the computing device 300 may allocate a target virtual memory space or a target physical memory space for the access request based on a free memory pool for the target kernel. The target virtual memory space may be, for example, a portion of the virtual memory space allocated for the target kernel. The target physical memory space may be, for example, a portion of the entire storage space of a RAM of the computing device 300 or a RAM connected to the computing device 300.

The computing device 300 may allocate the target virtual memory space or the target physical memory space for the access request based on flag information associated with a page of the first virtual memory address. For example, when one of the aforementioned first to fourth flags is set for the page of the first virtual memory address, the target virtual memory space or the target physical memory space may be allocated based on a memory allocation scheme corresponding to the set flag.

The computing device 300 may allocate a second physical memory space to the first virtual memory address, associate a second physical address of the second physical memory space with the first virtual memory address, and update a page table such that the new association between the first virtual memory address and the second physical memory space is reflected in the page table.

For example, when a micro allocation flag is associated with the page of the first virtual memory address, an internal-fragmented subpage managed by the free memory pool and a corresponding subframe may be allocated for the access request. Even when a physical memory space (or frame) available to be additionally allocated to the target process might otherwise insufficient, the computing device 300 may use the internal-fragmented subpage and the subframe to prevent a memory allocation failure.

Although the access request is received based on the first virtual memory address, in some cases, the computing device 300 may allocate a new virtual memory space and a physical memory space for the access request. As an example, the internal-fragmented subpage managed by the free memory pool may be newly allocated for the access request. Even when a physical memory space (or frame) available to be additionally allocated to the target process would otherwise be insufficient for the request, the computing device 300 may use the internal-fragmented subpage and the subframe, thereby preventing a failure in memory allocation. As another example, a portion of external-fragmented pages managed in the free memory pool may be newly allocated for the access request. Otherwise, when the memory allocation for the access request of the target process fails, a system panic or hang may occur.

In operation 960, the computing device 300 may process the access request based on either the allocated target virtual memory space or target physical memory space. For example, when the access request is a request to write, the computing device 300 may record data of the request in the target physical memory space. Additionally, "write operation fail" may be returned to the target process, or, when the access request is a request to read, the computing device 300 may return "read operation fail" to the target process.

According to a processing method for the access request based on operations 940 through 960, even an abnormal access request may be handled through the memory allocation and thus, a probability that the system panic or hang occurs may be reduced. Through this, system stability may increase. A page fault may occur when computation (in particular memory) overhead is occurring. In this situation, when an additional memory space is to be allocated, resources that might otherwise be unavailable (already used by the system) may be used, which may increase system instability. An internal-fragmented subpage that has been previously allocated may be used for another usage (for example, for handling an abnormal memory access request) through the free memory pool, thereby reducing the chance of an additional memory space being allocated. The free memory pool may improve stability of system operation.

Figure 10:
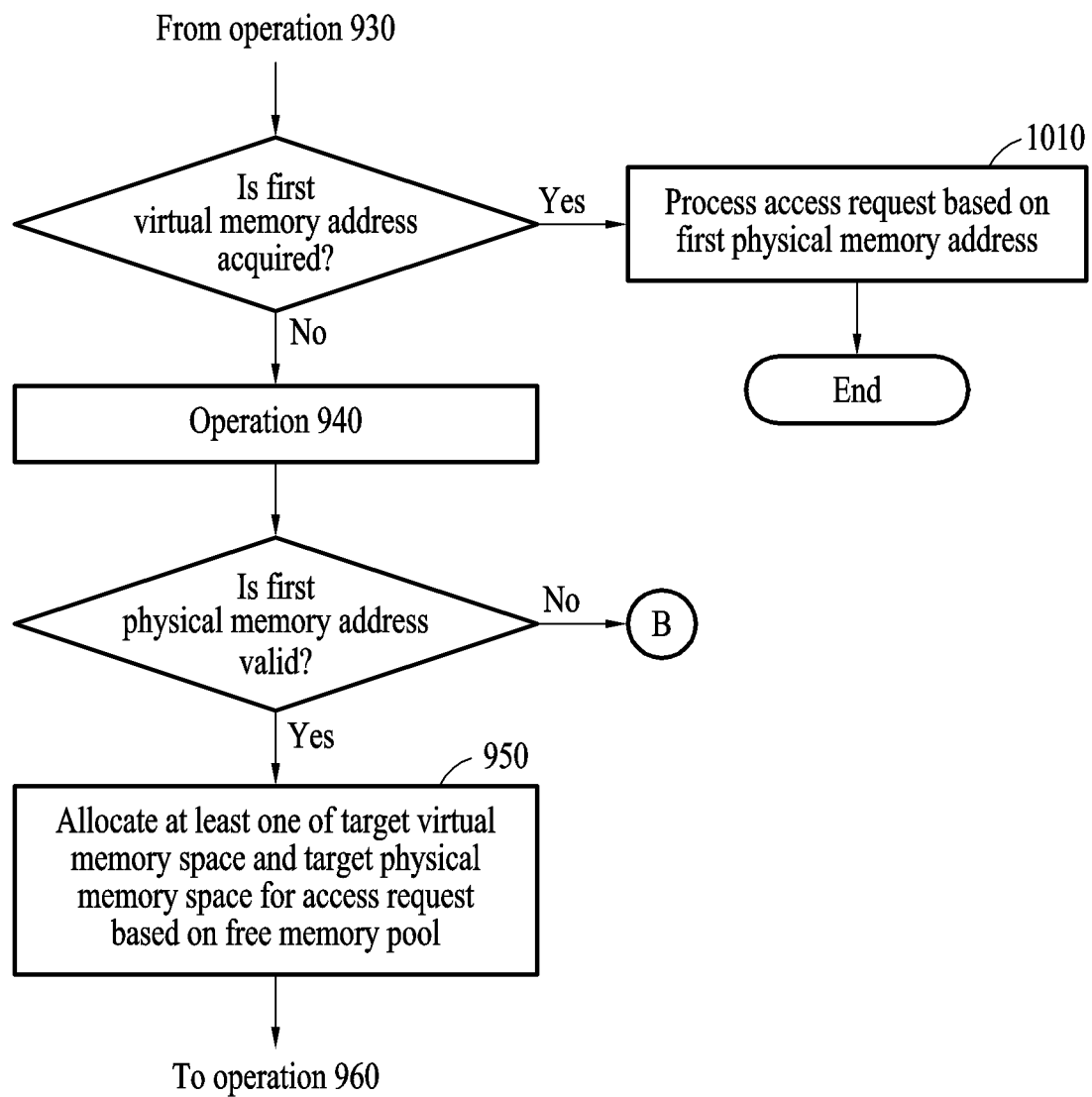
FIG. 10 is a flowchart illustrating an example of a method performed in a case in which a first physical memory address corresponding to a first virtual memory address is acquired, according to one or more embodiments.

FIG. 10 illustrates an example of a method performed in a case in which a first physical memory address corresponding to a first virtual memory address is acquired, according to one or more embodiments.

Operation 1010 may be performed when a first physical memory address corresponding to a first virtual memory address is acquired based on a page table through operation 930 of FIG. 9. In operation 1010, the computing device 300 may process an access request to a memory based on the first physical memory address. For example, when the access request is a request to write, the computing device 300 may record data in a space of the first physical memory address. As another example, when the access request is a request to read, the computing device 300 may acquire data stored in a first physical memory and return the acquired data to a target process.

Operation 950 may be performed when the first virtual memory address is determined to be a valid address by operation 940 of FIG. 9. When the first virtual memory address is determined to be an invalid address, operation B may be performed. Operation B is described in detail with reference to FIG. 11.

Figure 11:
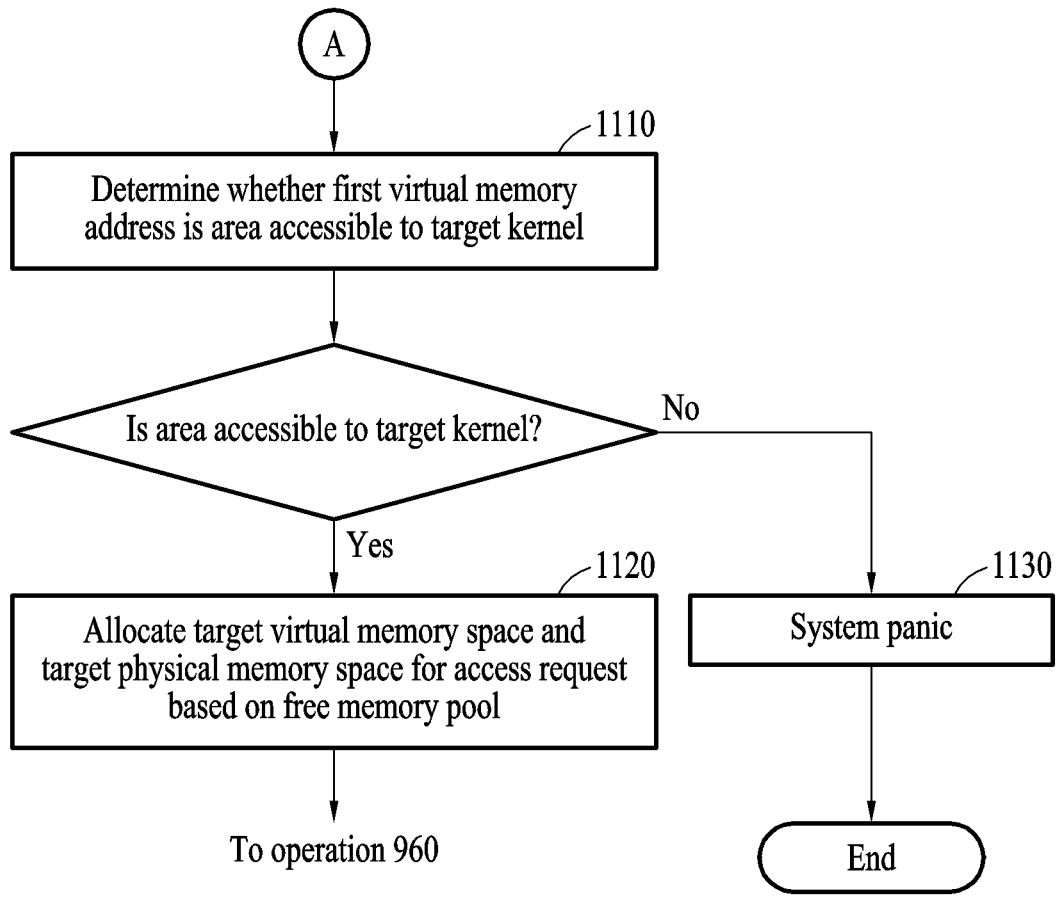
FIG. 11 illustrates an example of a method performed in a case in which a first virtual memory address is invalid, according to one or more embodiments

FIG. 11 illustrates an example of a method performed in a case in which a first virtual memory address is invalid, according to one or more embodiments. Operation B described with reference to FIG. 10 may include operations 1110 through 1130. In operation 1110, the computing device 300 may determine whether a space indicated by a first virtual memory address is an area accessible to a target kernel. For example, when the space indicated by the first virtual memory address is a vmalloc area, an I/O mapping area, or a map area, the computing device 300 may determine that the space indicated by the first virtual memory address is in an area accessible to the target kernel. As another example, when the space indicated by the first virtual memory address is a user area or a code area, the computing device 300 may determine the space indicated by the first virtual memory address to be an area inaccessible to the target kernel.

On a page of the first virtual memory address, a flag indicating whether the corresponding page is an area accessible to the target kernel may be set in advance. By identifying the flag, the computing device 300 may determine whether the space indicated by the first virtual memory address is in an area accessible to the target kernel.

When the space indicated by the first virtual memory address is determined as being in an area accessible to the target kernel, operation 1120 may be performed. When the space indicated by the first virtual memory address is determined to not be in an area accessible to the target kernel, operation 1130 may be performed.

In operation 1120, the computing device 300 may allocate a target virtual memory space and a target physical memory space for the access request based on a free memory pool. For example, the computing device 300 may allocate an internal-fragmented subpage of the free memory pool and a subframe corresponding to the subpage to the target virtual memory space and the target physical memory space for the access request.

As another example, for the access request, the computing device 300 may allocate an external-fragmented normal page of the free memory pool and a normal frame corresponding to the normal page to the target virtual memory space and the target physical memory space.

In operation 1130, when the space indicated by the first virtual memory address is determined to not be in an area accessible to the target kernel, memory allocation for the first virtual memory address may not be performed and thus, a system panic or hang may occur in the computing device 300.

Figure 12:
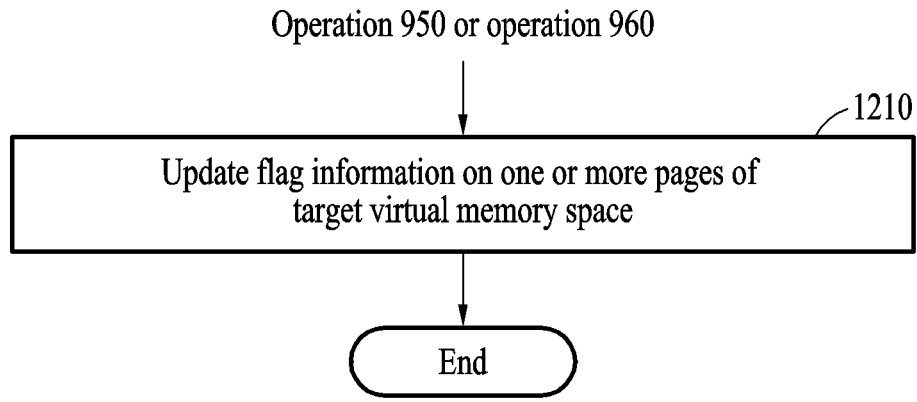
FIG. 12 illustrates an example of updating flag information on pages of a target virtual memory space, according to one or more embodiments.

FIG. 12 is a illustrates an example of updating flag information on pages of a target virtual memory space, according to one or more embodiments. Operation 1210 may be performed after operation 950 or 960 of FIG. 9 is performed. In operation 1210, the computing device 300 may update flag information on one or more pages of a target virtual memory space. The flag information may be updated to indicate a memory allocation scheme to be performed for managing the corresponding page. For example, when a flag of a page is the second flag, and when a physical memory space is mapped to the page, the flag of the page may be changed to the first flag. As another example, when a flag of a page is the first flag, and when a physical memory space of additional hardware is mapped to the page, the flag of the page may be changed to the fourth flag.

Figure 13:
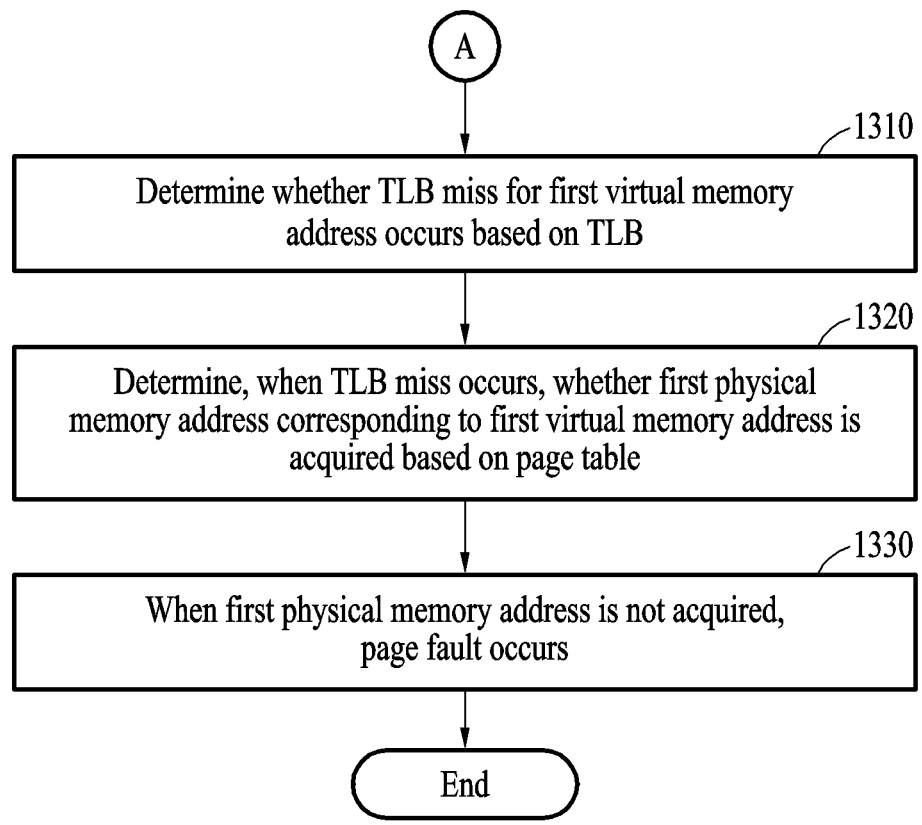
FIG. 13 illustrates an example of processing an access request to a memory in a case in which flag information is not allocated to a page corresponding to a first virtual memory address, according to one or more embodiments.

FIG. 13 illustrates an example of processing an access request to a memory in a case in which flag information is not allocated to a page corresponding to a first virtual memory address, according to one or more embodiments. In operation 1310, the computing device 300 may determine whether a TLB miss for a first virtual memory address occurs based on a TLB that associates virtual memory addresses with physical memory addresses.

When a TLB hit occurs, the computing device 300 may acquire a first physical memory address corresponding to a first virtual memory address and process the access request based on the acquired first physical memory address. For example, when the access request is a request to read, the computing device 300 may acquire data of the first physical memory address and transmit the acquired data to the target process. As another example, when the access request is a request to write, the computing device 300 may store data in the first physical memory address.

In operation 1320, when a TLB miss occurs, the computing device 300 may determine whether a first physical memory address corresponding to the first virtual memory address is acquired based on a page table (e.g., the page table 160 of FIG. 1). For example, when the first physical memory address corresponding to the first virtual memory address is acquired, the computing device 300 may process the access request based on the acquired first physical memory address.

In operation 1330, when the first physical memory address corresponding to the first virtual memory address is not acquired, a page fault may occur.

Examples of hardware components that may be used to perform the operations described in this application where appropriate include servers, computing devices, CPUs, cores, processors, processing devices, processing units, memories, storage devices, graphics processing devices (e.g., GPUs), communicators, NICs, and any other electronic components configured to perform the operations described in this application, e.g., with respect to FIGS. 1-13. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic unit or array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above. In addition, as a non-limiting example, the instructions may be hard-coded into a processor such as a DPU (e.g., where the DPU may be implemented as an FPGA). In some implementations, a DPU may be configured to perform any one, any combination, or all operations and/or methods described herein, e.g., with pluggable modules, as a non-limiting example.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A method of processing an access request to a memory, which is performed in association with execution of a kernel of a computing device, the method comprising:
   receiving the access request to the memory based on a first virtual memory address;
   determining whether a first physical memory address corresponding to the first virtual memory address is acquired based on a page table;
   determining, in response to determining that the first physical memory address corresponding to the first virtual memory address is not acquired, whether the first virtual memory address is a valid address;
   allocating, in response to determining that the first virtual memory address being is a valid address, at least one of a target virtual memory space and a target physical memory space for the access request based on a free memory pool for the kernel, the free memory pool is configured to comprise at least one of a page of a virtual memory space or a subpage of the page that is not currently used by a process, the allocating comprising:
      allocating full frames of physical memory and associating the full frames with respective full virtual pages of a virtual memory space;
      allocating partial frames of the physical memory and associating the partial frames with respective partial pages of the virtual memory address space; and
      including partial frames and/or partial pages in the free memory pool, wherein the target virtual memory space or the target physical memory space comprises a partial frame and/or a partial page; and
   processing the access request based on the allocated target virtual memory space or target physical memory space.

2. The method of claim 1, further comprising:
   determining whether a translation lookaside buffer (TLB) miss for the first virtual memory address occurs based on a TLB associating virtual memory addresses with physical memory addresses,
   wherein the determining whether the first physical memory address corresponding to the first virtual memory address is acquired is performed in response to determining that a TLB miss has occurred.

3. The method of claim 1, further comprising:
   in response to determining that the first physical memory address corresponding to the first virtual memory address has been acquired, processing the access request based on the first physical memory address.

4. The method of claim 1, wherein the determining of whether the first virtual memory address is a valid address comprises:
   determining whether the first virtual memory address is an address in a virtual memory area allocated to the kernel.

5. The method of claim 1, wherein the free memory pool comprises at least one subpage, the subpage being smaller than the page.

6. The method of claim 5, wherein the allocating comprises allocating a physical memory subframe corresponding to the subpage.

7. The method of claim 1, wherein the free memory pool comprises at least the page and the subpage, the subpage being smaller than the page.

8. The method of claim 1, further comprising:
   determining, in response to the first virtual memory address being an invalid address, whether the first virtual memory address is an area accessible to the kernel; and
   allocating, in response to the first virtual memory address being the area accessible to the kernel, a target virtual memory space and a target physical memory space for the access request based on the free memory pool.

9. The method of claim 1, further comprising:
   updating flag information on one or more pages of the target virtual memory space, wherein the flag information causes subpages of the one or more pages of the target virtual memory space to be managed with respect to the free memory pool.

10. The method of claim 1, wherein the access request comprises a memory allocation request, and wherein the allocating the virtual memory space or the physical memory space is based on flag information received through the memory allocation request.

11. The method of claim 1, wherein the computing device comprises a central processing unit (CPU) comprising a plurality of cores, and wherein at least one of the cores is allocated for the kernel.

12. The method of claim 1, wherein the kernel comprises an auxiliary kernel executed by a main kernel.

13. The method of claim 1, wherein the kernel is booted based on an application or program executed by the computing device, and
   for the kernel, at least a portion of cores of the computing device and at least a portion of a memory area of the computing device is allocated to the kernel.

14. A non-transitory computer-readable recording medium comprising instructions configured to cause a computing device to perform the method of claim 1.

15. A computing device comprising:
   a processor; and
   a memory storing instructions configured to cause the processor to process an access request to a memory and:
      receive an access request to a memory based on a first virtual memory address;
      determine whether a first physical memory address corresponding to the first virtual memory address is in a page table;
      determine, in response to determining that the first physical memory address corresponding to the first virtual memory address is not acquired, whether the first virtual memory address is a valid address; and
      for the access request, in response to determining that the first virtual memory address is a valid address, allocate at least one of a target virtual memory space and a target physical memory space from a free memory pool, the free memory pool comprises at least one of a page of a virtual memory space or a subpage of the page that is not currently used by a process, the allocation comprising:

allocation of full frames of physical memory and associate the full frames with respective full virtual pages of a virtual memory space;

allocation of partial frames of the physical memory and associate the partial frames with respective partial pages of the virtual memory address space; and includes partial frames and/or partial pages in the free memory pool, wherein the target virtual memory space or the target physical memory space comprises a partial frame and/or a partial page.

16. The computing device of claim 15, wherein the processor comprises a core allocated to the kernel from among a plurality of cores of the computing device.

17. The computing device of claim 15, wherein the target physical memory space is a portion of an entire storage space of a random-access memory (RAM) of the computing device.

18. The computing device of claim 15, wherein the allocating is performed based on a page fault.

19. The computing device of claim 18, wherein the page fault corresponds to a physical frame not having been allocated for the first virtual memory address.

* * * * *